(12) United States Patent
Jang et al.

(10) Patent No.: US 8,268,450 B2
(45) Date of Patent: Sep. 18, 2012

(54) THERMOPLASTIC POLYAMIDE RESIN COMPOSITIONS HAVING IMPROVED PAINT ADHESION

(75) Inventors: Lee-Wook Jang, Gyeonggi-Do (KR); Yeong-Chool Yu, Seoul (KR); Jong-Su Lee, Gyeonggi-Do (KR)

(73) Assignee: Rhodia Polyamide Co., Ltd., Seoul (KR)

( * ) Notice: Subject to any disclaimer, the term of this patent is extended or adjusted under 35 U.S.C. 154(b) by 0 days.

(21) Appl. No.: 12/666,809

(22) PCT Filed: Jun. 27, 2008

(86) PCT No.: PCT/KR2008/003736
§ 371 (c)(1),
(2), (4) Date: Oct. 13, 2010

(87) PCT Pub. No.: WO2009/005260
PCT Pub. Date: Jan. 8, 2009

(65) Prior Publication Data
US 2011/0020651 A1    Jan. 27, 2011

(30) Foreign Application Priority Data
Jun. 29, 2007  (KR) .................. 10-2007-0064858

(51) Int. Cl.
*B29D 23/00*    (2006.01)
*B29D 23/24*    (2006.01)
*C08L 77/00*    (2006.01)

(52) U.S. Cl. .................. 428/474.4; 427/256; 428/475.5; 428/477.7; 525/56; 525/58; 525/60; 525/66; 525/133; 525/179; 525/181; 525/183

(58) Field of Classification Search ............... 525/56, 525/58, 60, 66, 133, 179, 181, 183; 428/474.4, 428/475.5, 477.7; 427/256
See application file for complete search history.

(56) References Cited

U.S. PATENT DOCUMENTS

| | | | | |
|---|---|---|---|---|
| 4,086,295 A | * | 4/1978 | Mori et al. | ............ 525/183 |
| 4,820,771 A | * | 4/1989 | Mussig et al. | ............ 525/183 |
| 6,733,854 B2 | | 5/2004 | Lee et al. | |

FOREIGN PATENT DOCUMENTS

| | | |
|---|---|---|
| JP | 16-237684 | 8/2004 |
| JP | 17-145995 | 6/2005 |
| KR | 10 0387850 | 6/2003 |

OTHER PUBLICATIONS

International Search Report issued Oct. 31, 2008 by the Korean Patent Office for PCT/KR2008/003736.

* cited by examiner

*Primary Examiner* — Ana Woodward
(74) *Attorney, Agent, or Firm* — SNR Denton US LLP

(57) ABSTRACT

Thermoplastic polyamide resin compositions include the essential components of polyamide resins, polyalcohol and epoxy resin, and, optionally, one or more additives selected from among thermoplastic impact modifiers, reinforcement agents, and polyoxides; such thermoplastic polyamide resin compositions provide superior impact resistance, heat resistance, low degree of deformation, low degree of contraction, and external appearance, but also superior paint adhesion properties without requiring a primer, and function as an adhesion medium that advantageously may be applied to the interior and exterior parts of an automobile requiring painting.

15 Claims, No Drawings

THERMOPLASTIC POLYAMIDE RESIN COMPOSITIONS HAVING IMPROVED PAINT ADHESION

CROSS-REFERENCE TO PRIORITY/PCT APPLICATIONS

This application claims priority under 35 U.S.C. §119 of KR 10-2007-0064858, filed Jun. 29, 2007, and is a continuation/national phase of PCT/KR 2008/003736, filed Jun. 27, 2008 and designating the United States (published in the English language on Jan. 8, 2009, as WO 2009/005260 A1), each hereby expressly incorporated by reference in its entirety and each assigned to the assignee hereof.

The thermoplastic polyamide resin composition of the present invention includes the essential components of polyamide resin, polyalcohol and epoxy resin. Said composition may comprise the one or more optional additives from the group consisting of thermoplastic impact modifier, reinforcement agent, and polyoxide. The thermoplastic polyamide resin composition of the invention provides superior impact resistance, heat resistance, low degree of deformation, low degree of contraction, and external appearance but also superior paint adhesion properties without having to use a primer. Said composition functions as an adhesion medium, such that it may advantageously be applied to the interior and exterior parts of an automobile requiring painting.

The present invention relates to thermoplastic polyamide resin composition having improved paint adhesion, and more particularly to thermoplastic polyamide resin composition which exhibits superior paint adhesion properties and which therefore does not require a primer, which is an adhesion medium during painting process.

The polyamide resin composition generally has superior mechanical properties, as well as heat resistance and chemical resistance. Moreover, it may be easily reinforced by employing diverse mineral substances such as glass fiber, carbon fiber, talc, kaolin, wollastonite, calcium carbonate, and barium sulphate, thereby it is possible not only to attain very high degrees of strength and elasticity, but it is also possible to attain very high degrees of impact properties from low temperature to high temperature by adding diverse types of impact resistant materials.

For these reasons, the polyamide resin composition—which is easier to process than metals, which has the advantage of being lightweight, and which has the effects of more freedom in designing—is being widely used in automobiles and other diverse industrial fields.

However, where polyamide resin composition is applied to the interior and exterior of an automobile which require painting, due to low adhesion between polyamide and paint, a primer, which functions as an adhesion medium, and the like, have been used in order to improve adhesion between paint exhibiting colour and polyamide during painting process.

However, although it is necessary to avoid using such primers for reasons such as environmental protection demands such as regulations concerning the use of volatile organic compounds (VOC) and cost reduction, if a primer is not used, it is not possible to attain sufficient adhesion with paint, whereby problems such as paint peeling are caused.

Moreover, for an automobile exterior product, since painting is done at high temperatures of 140~180° C., in order to apply polyamide resin to an automobile exterior product, high degrees of heat resistance and impact resistance are required so as not to cause such problems as thermosoftening at high temperature, heat shrink deformation, loss of glossiness, and lowered properties of matter.

Conventionally, International Patent Publication No. WO2005/113695 discloses composition having improved paint adhesion by adding phenol novolac resin to polyamide; however, this composition has problems such as low heat resistance and that a product changes its colour after being painted due to heat and ultraviolet radiation.

Accordingly, it is an objective of the present invention to provide thermoplastic polyamide resin composition having improved paint adhesion property which not only has superior impact resistance, heat resistance, low degree of deformation, low degree of contraction, external appearance, etc., but also superior paint adhesion property without having to use a primer, which is an adhesion medium, such that it may advantageously be applied to the interior and exterior parts of an automobile.

In order to achieve the above stated objective, the present invention provides thermoplastic polyamide resin composition which includes a) crystalline polyamide resin, b) polyalcohol, and c) epoxy resin.

Notably, the polyamide resin composition having improved paint adhesion, comprises at least:

a) from 40 to 98 weight % of crystalline polyamide resin, preferably from 80 to 98 weight % of crystalline polyamide resin;

b) from 0.1 to 30 weight % of polyalcohol, preferably from 0.1 to 10 weight % of polyalcohol; and c) from 0.1 to 30 weight % of epoxy resin, preferably from 0.1 to 10 weight % of epoxy resin.

The present invention is described in greater detail hereinbelow.

The polyamide resin composition of the present invention may additionally include one or more additives selected from the group consisting of d) thermoplastic impact modifier, e) reinforcement agent, and f) polyoxide.

Each component is described in greater detail hereinbelow.

(a) Polyamide Resin

The polyamide resin which is included in the composition of the present invention may be any crystalline resin widely known in the present field, and examples include polyamide-6 obtainable as ring-opening polymerization products of lactams such as ϵ-caprolactam and ω-dodecalactam; polyamide polymers obtainable from such amino acids as aminocaproic acid, 11-aminoundecanoic acid, and 12-aminododecanoic acid; aliphatic, cycloaliphatic or aromatic diamines such as ethylenediamine, tetramethylenediamine, hexamethylenediamine, undecamethylenediamine, dodecamethylenediamine, 2,2,4-trimethylhexamethylenediamine, 2,4,4-trimethylhexamethylenediamine, 5-methylnonahexamethylenediamine, m-xylenediamine, p-xylenediamine, 1,3-bis-aminomethylcyclohexane, 1,4-bis-aminomethylcyclohexane, 1-amino-3-aminomethyl-3,5,5-trimethylcyclohexane, bis(4-aminocyclohexane)methane, bis(4-methyl-4-aminocyclohexyl)methane, and 2,2-bis(4-aminocyclohexyl)propane, bis(aminopropyl)piperazine, aminoethylpiperidine; polyamide polymers obtainable from such aliphatic, cycloaliphatic or aromatic dicarboxylic acids as adipic acid, sebacic acid, azelaic acid, dodecanedioic acid, terephthalic acid, isophthalic acid, 2-chloroterephthalic acid, 2-methyl terephtahlic acid, and 5-methylisophthalic acid; and copolymers of the polyamide resins, and these may be employed singly or in a combination of two or more kinds.

Particularly preferred polyamide resins from the above list include polyamide-6, polyamide-66, polyamide-610, polyamide-11, polyamide-12, terephtahlic acid or iso-phthalic acid polyamide, aliphatic or aromatic polyamide, a copolymer thereof, and a mixture thereof; and among these, it is most preferable to use polyamide-6, polyamide-66 and a copolymer thereof (polyamide-66/6), either singly or in a combination of two or more kinds. The general structural formulae of these resins are represented as follows.

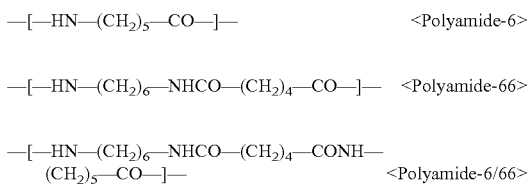

The relative viscosity of the crystalline polyamide used in the present invention is preferably in the range of from 2.0 to 3.7 (a solution of 1 g of copolymer in 100 ml of 90% formic acid, measured at 25° C.), and the number average molecular weight is preferably from 5,000 to 70,000.

In the present invention, said crystalline polyamide resin may be included in the amount of from 40 to 98 weight % based on the total weight of the composition.

(b) Polyalcohol

Examples of the polyalcohol which can be used in the present invention include oligomers of diglycerol, trigrycerol, tetraglycerol, pentaglcerol, hexaglycerol, heptaglycerol, octaglycerol, nonaglycerol, decagylcerol, and a mixture thereof, as well as polyglycerol, polyvinyl alcohol, and ethylene vinyl alcohol copolymer (EVOH). However, such polyalcohol is not limited to these, and these may be employed singly or in a combination of two or more kinds of the above listed polyalcohols, polyglycerol, and polyvinyl alcohol particularly preferable.

The polyalcohol used in the present invention may for example have the general structural formula as indicated below, and it is readily available on the market or it may be prepared according to widely known methods, such as by reacting glycerol and epichlorohydrin in the presence of a basic catalyst, or by carrying out condensation reaction of glycerol in the presence of alkali.

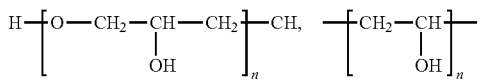

The viscosity of the polyalcohol used in the present invention is preferably in the range of from 40 to 500 cps (4% aqueous solution, measured at 20° C.), and the number average molecular weight is preferably in the range of from 150 to 2,000.

In the present invention, in order to improve the paint adhesion property of the polyamide resin composition, said polyalcohol may be included from 0.1 to 30 weight % based on the total weight of the composition, and more preferably in the range of from 0.1 to 10 weight %. If the content of the polyalcohol exceeds said ranges, the resulting composition's hydrophilicity is increased too much, thereby causing problems of lowered properties of matter due to increased absorption and lowered dimensional stability; and if the content of the polyalcohol is below said ranges, it is not possible to secure sufficient reactivity. Due to the fact that said polyalcohol has the hydroxyl (—OH) groups in the molecule, it can cause reaction with coating materials such as paints to induce chemical bonding, and at the same time, due to its high hydrophilicity, it can increase wettability, which is an important factor during application of coating materials such as paints, thereby enabling high degree of adhesion with coating materials when it is added to the polyamide resin.

(c) Epoxy Resin

In the present invention, the term "epoxy resin" generally refers to any compound including the epoxy functional group, and it is preferable to use a compound having the number average molecular weight in the range of from 5,000 to 200,000 and having two or more epoxy groups per one molecule.

Examples of the epoxy resin which can be used in the present invention include DGEBA (diglycidyl ether of bisphenol A) type epoxy resin, DGEBF (diglycidyl ether of bisphenol F) type epoxy resin, hydrogenated BPA (hydrogenated bisphenol A) type epoxy resin, brominated epoxy resin, cycloaliphatic epoxy resin, rubber modified epoxy resin, aliphatic polyglycidyl type epoxy resin, glycidyl amine type epoxy resin. However, such epoxy resin is not limited to these, and these may be employed singly or in a combination of two or more kinds.

Such epoxy resin—e.g., bisphenol A, bisphenol F, as well as hydrogenated and brominated bisphenol A and bisphenol F, as well as compounds having two or more hydroxyl groups—is readily available on the market or it may be obtained from reacting with epichlorohydrin.

The number of functional groups of said epoxy resin can be increased, depending on degree of polymerization and configuration of chemical matter, from one to four or more; and the epoxy equivalent weight of the epoxy resin used in the present invention is preferably from 100 to 6000 g/eq., and the epoxy resin may assume the form of either liquid or solid.

In order to improve the paint adhesion property of the polyamide resin composition, said epoxy resin may be included from 0.1 to 30 weight % based on the total weight of the composition, and more preferably in the range of from 0.1 to 10 weight %. If the content of the epoxy resin exceeds said ranges, the resulting composition's fluidity deteriorates thereby causing problems during processing; and if the content of the epoxy resin is below said ranges, it is not possible to secure sufficient reactivity with the polyalcohol.

As such, if an epoxy resin having high reactivity is added to the polyamide resin, it is possible to attain even greater heat resistance and impact resistance through chemical bonding, and in addition it can function as a binder between the polyalcohol component and the polyamide by having the epoxy structure within the molecule.

As such, if for example only polyalcohol is added to the polyamide, due to increased hydrophilicity which causes increased absorption, the properties of the composition are deteriorated and the dimensional stability is more or less decreased; and if only epoxy resin is added, the fluidity is decreased through the reaction of the polyamide and the epoxy resin thereby causing problems during processing. On the other hand, the composition of the present invention which is obtained from simultaneously adding polyalcohol and epoxy resin to the polyamide resin has high properties of matter such as heat resistance and impact resistance, and at the same time, it has superior adhesion property with paint such that it is not necessary to use a primer during painting process.

(d) Thermoplastic Impact Modifier

Among the components capable of optionally being added to the polyamide composition of the present invention, the thermoplastic impact modifier can improve the impact resistance at the room temperature and low temperature, and it may optionally be added from 1 to 50 weight % based on the total weight of the polyamide composition, and more preferably in the range of from 5 to 20 weight %.

In the present invention, the thermoplastic impact modifier may employ the below discussed four components (from d-1 to d-4) either singly or in an appropriate combination of two or more components, thereby obtaining superior impact resistance effect.

(d-1) In order to improve the external appearance of the polyamide composition and to promote low degrees of contraction and deformation as well as superior coating ability and impact resistance, an aromatic vinyl copolymer obtained from copolymerizing one or more members of the group consisting of aromatic vinyl monomers and vinyl cyanide monomer, with conjugated diene rubber, may be suitably used.

The average particle size of said conjugated diene rubber is preferably in the range of from 0.2 to 1.0 µm, and specific examples of the conjugated diene rubber include butadiene, styrene-butadiene, acrylonitrile-butadiene, isoprene, chloroprene, neoprene, and 1,3-pentadiene.

In addition, said aromatic vinyl monomers may be selected from styrene, $\alpha$-methyl styrene, p-methyl styrene, vinyl naphthalene, etc.; and examples of said vinyl cyanide monomers include acrylonitrile, methacrylonitrile, and $\alpha$-chloroacrylonitrile.

(d-2) In order to improve the interfacial adhesion strength with the polyamide, ethylene-propylene-diene copolymer chemically grafted with maleic anhydride of from 0.5 to 5 weight %, may be employed.

(d-3) Modified aromatic vinyl compound/maleimide copolymer, which is obtained from copolymerization of said aromatic vinyl monomers and maleimide monomer, unsaturated dicarboxylic acid or unsaturated dicarboxylic anhydride monomer, or from copolymerization of said aromatic vinyl monomers and other vinyl monomers capable of copolymerizing therewith, may be used.

Examples of said maleimide monomer include N-methyl maleimide, N-ethyl maleimide, N-cyclohexyl maleimide, and N-phenyl maleimide. Examples of said unsaturated dicarboxylic acid or unsaturated dicarboxylic anhydride include maleic anhydride, methylmaleic anhydride, 1,2-dimethylmaleic anhydride, ethylmaleic anhydride, phenyl maleic anhydride, acrylic acid, and methacrylic acid. Examples of said other vinyl monomers include styrene, $\alpha$-methyl styrene, p-t-butyl styrene, 2,4-dimethyl styrene, and vinyl toluene.

The copolymers having this structure can, for example, convert the maleic anhydride structure into the maleimide structure through partial imidization reaction; and unreacted maleic anhydride can function as a reagent for the polyamide.

(d-4) Aromatic vinyl compound/maleimide/vinyl cyanide copolymer, which is obtained from aromatic vinyl monomers, maleimide monomers and vinyl cyanide monomers, may be employed.

(e) Reinforcement Agent

In order to improve mechanical properties such as tensile strength at the room temperature and low temperature, flexural strength, tensile modulus of elasticity, and flexural modulus of elasticity, the polyamide resin composition used in the present invention may optionally include, in addition to the above discussed essential components (from a to c), a reinforcement agent in the amount of from 0 to 50 weight % based on the total weight of the polyamide composition, and preferably in the range of from 10 to 30 weight %.

In the present invention, examples of such reinforcement agent include glass fiber, mineral filler, either singly or in a combination; and other than glass fibre, it is possible to employ glass beads, glass bubbles, and the like, or carbon fibre and the like may be employed. Representative examples of mineral filler include such clay compounds as talc, kaolin, wollastonite and bentonite, as well as such inorganic salt compounds as calcium carbonate and barium sulphate.

(f) Polyoxide

Moreover, in order to improve the dimensional stability of the composition, the polyamide resin composition of the present invention may optionally include, in addition to the essential components (from a to c), polyoxide in the amount of from 1 to 30 weight % based on the total weight of the composition, and preferably from 5 to 15 weight %.

If the content of the polyoxide component included in the polyamide resin composition of the present invention exceeds said ranges, high melt viscosity causes deterioration in processability and melt elongation, and moreover, it may cause problems such as thermal degradation and severe melt bursting due to significantly increased melt pressure, melting point, and the like, during melt extrusion process.

Examples of the polyoxide compounds capable of being used in the present invention include aliphatic polyoxide such as hydrophilic water-soluble polymers obtained from ring-opening polymerization of alkylene oxide, such as polymethylene oxide (POM) and polyethylene oxide (PEO) and their copolymers, as well as aromatic polyoxide such as polyphenylene oxide (PPO).

In addition, within the extent not violative of the purpose of the present invention, antioxidants and thermal stabilizers, which are commonly used as plastic processing agents, as well as aromatic amines, hindered phenols, phosphorus, and sulphur, which are used as ultraviolet radiation absorbents, can be employed. Moreover, further additives such as dispersing agents, dyes, pigments, surfactants, release agents, lubricants, plasticizers, gloss improvement agents, electrically conductive fillers, and anti-static agents, may be employed to impart various effects.

The polyamide resin composition of the present invention can be obtained, for example, by melt-mixing the above discussed components by using a single-screw extruder or a twin-screw extruder.

The polyamide resin composition according to the present invention can greatly improve the paint adhesion property by modifying the polyamide resin surface with polyalcohol, epoxy, and the like, having hydroxyl groups, such that it is not necessary to use a primer during painting process to achieve the conventional superior coating property obtained from using a primer, while maintaining, or more or less improving, various good properties of polyamide (e.g., rigidity, toughness, heat resistance, etc.). Moreover, by improving the surface tension by introducing many hydroxyl groups to the polyamide surface, the wettability is improved, thereby making it possible to obtain better results in painting.

Since the hydroxyl groups introduced to the polyamide resin have hydrophilicity, it is not only possible to be applied to water-soluble paint systems in the future, it is also possible to improve mechanical properties and thermal characteristics by compensating for the molecular weight reduction due to thermal decomposition of the polyamide resin, through reaction between the added matter (polyalcohol and epoxy resin) and the hydroxyl groups.

The composition according to the present invention can be applied to all parts requiring painting among all types of the interior and exterior parts of vehicles, such as automobiles, trucks, vans, motorcycles, bicycles, all terrain vehicles, aquatic vehicles, tractors and other farm equipment, and aircafts. Examples of automobile parts include fender, the wheel covers, hoods, hub cabs, doors, trunk doors, protective moldings, tank flaps, bumpers, mirro housing, and the instrument panel of an automobile.

Parts made be obtain by various processes such as molding, injection molding, blow molding, injection blow molding, extrusion and thermoforming.

The present invention also concerns the use of a polyamide resin composition as mentioned above for obtaining parts which may be painted without the use a primer during painting process.

Hereinbelow, the present invention is described in greater detail by referring to the examples. However, it is to be understood that the below examples are used merely to illustrate the present invention, and that the scope of the present invention is not to be limited thereby.

EXAMPLES

By referring to the below Examples 1-10 and Comparative Examples 1-14, the polyamide resin composition of the present invention and comparative compositions are prepared, which are then tested for their various properties, i.e., paint adhesion, tensile strength, impact strength, heat distortion temperature, etc., whereby the superior effects of the polyamide resin composition of the present invention are described in greater detail.

Initially, each component used in the Examples and Comparative Examples of the present invention are classified and explained hereinbelow and they are indicated with reference symbols.

A-I: Crystalline polyamide-66 polymer obtained by condensation polymerization of the equimolar hexamethylene diamine and adipic acid. Its commercial name is Technyl 26A, made by Rhodia, having a relative viscosity of 2.6 (solution of 1 g of polymer in 100 ml of 90% formic acid, measured at 23° C.), and the melting point of 260° C.

A-2: Crystalline polyamide-6 polymer obtained by ring opening polymerization of ϵ-caprolactam. Its commercial name is Toplamide 1020, made by Hyosung, having a relative viscosity of 3.3 (solution of 1 g of polymer in 100 ml of 90% sulphuric acid, measured at 23° C.), and the melting point of 220° C.

A-3: Crystalline polyamide-66/6 copolymer obtained by copolymerization of 10 weight % of the raw material of polyamide-6 (ϵ-caprolactam) and 90 weight % of the raw material of polyamide-66 (AH-salt, combined state of hexamethyl diamine and adipic acid). Its commercial name is Technyl 27B10, made by Rhodia, having a relative viscosity of 2.7 (solution of 1 g of polymer in 100 ml of 90% sulphuric acid, measured at 23° C.), and the melting point of 245° C.

B-1: Polyalcohol obtained by alkali condensation of diglycerol or by reaction of diglycerol and epichlorohydrin. Its commercial name is Polyglycerol-3, made by Solvay, having a viscosity of 410 cps (4% aqueous solution, measured at 20° C.), and a density of 1.284 g/ml.

B-2: Poly vinyl alcohol derived from poly vinyl acetate. Its commercial name is PALINOL P-24S, made by DC Chemical Co., having a viscosity of 44.0~52.0 cps (4% aqueous solution, measured at 20° C.), and a saponification degree of 86~89 mol %.

C; DGEBA type epoxy resin. Its commercial name is YD-012, made by Kukdo Chemical Co., having epoxy equivalent weight of 600~700 g/eq., having a melt viscosity of 800~1600 cps (measured by ICI viscometer at 150° C.), the softening point of 75~85° C., and a density of 1.16~1.20 g/cm$^3$.

D-1; Acrylonitrile-butadiene-styrene copolymer as an aromatic vinyl copolymer. Its commercial name is HI-100H, made by LG Chem. Co.

D-2; Ethylene-propylene-diene copolymer grafted with maleic anhydride. Its commercial name is N-Tafmer (registered trade mark) MPO620, made by Mitsui Chemicals, Inc.

D-3; Aromatic vinyl/maleimide copolymer composed of 46 weight % of styrene, 53 weight % of N-phenyl maleimide, and 1 weight % of maleic anhydride. Its commercial name is Polyimilex (registered trade mark) PSX-371, made by Nippon Shokubai Co.

D-4; Aromatic vinyl/maleimide/vinyl cyanide copolymer composed of styrene IN-phenyl maleimide/acrylonitrile. Its commercial name is Polyimilex (registered trade mark) PAS1460, made by Nippon Shokubai Co.

E-1; E-glass type glass fibre. Its commercial name is 301CL, made by CPIC, having alkali content of 0.30~0.80%, the diameter of 9~11 μm, the length of 3~4.5 mm, Lor (Loss On Ignition) of 0.30~0.60%, and a density of 0.50~0.80 g/cm$^3$.

E-2: Talc as a mineral filler

F: Polyphenylene oxide (PPO). Its commercial name is Xyron (registered trade mark) 600H, made by Asai Kasei, having a density of 1.06 g/cm$^3$, and HDI (heat deflection temperature) of 130° C.

Examples 1-10 and Comparative Examples 1-14

Preparation of Polyamide Resin Composition

The above selected components were uniformly mixed in a super mixer according to each blending ratio of the examples and the comparative examples. Although it is possible to use either a single-screw extruder or a twin-screw extruder, a twin-screw extruder (the internal diameter 30 mm, L/D=30) was used in the present invention. The cylinder temperatures inside the extruder were set at 260-280° C. when A-I was used alone or when A-I was used in a mixture, among the polyamide resin constituents; and at 250° C. when A-2 was used alone among the polyamide resin constituents. The gas inside the screws were exhausted under the screw rotational velocity of 250~300 RPM under the vacuum pump pressure of 50~70 cmHg. At this point, the throughput was 25~30 kg/hr, whereby it was thoroughly melt-blended inside the extruder cylinder and the formed composition was quenched in a cold water bath and pelletized to a prescribed size using a pelletizer.

Drying oven was used to make moisture content of the pellets under 0.1% for 12 hours. The temperature of the oven was set at 85~90° C. under nitrogen condition. Injection machine (German, ENGEL), having clamping force of 80 tons, injection volume of 189.44 cc (6.4 ounce), was used to prepare the specimen for various property tests. Cylinder temperatures were set at 250° C. (only when A-2 polyamide resin was used alone) or 280° C., the mould temperature at 80° C., injection pressure at 50~80 bar, injection speed at 40~60 mm/sec, injection time at 3 seconds, and cooling time at 15 seconds.

After preparation of specimen, several tests were done using the following methods and the result was presented in Table 1-5 hereinbelow.

Test items and analysis methods are as follows.

a) Tensile strength: Tensile properties of the compositions were measured by the Instron apparatus according to the testing method of ASTM D-638. The unit of tensile strength is kgf/cm$^2$.

b) Flexural strength: Flexural properties of the compositions were measured by the Instron apparatus according to the testing method of ASTM D-790. The unit of flexural strength is $kgf/cm^2$.

c) Izod impact strength: Notched Izod impact strengths were determined by the Izod impact tester according to the testing method of ASTM D-256. The unit of impact strength is $kgf/cm^2$.

d) Heat distortion temperature: HDT was measured under the load of 4.6 $kgf/cm^2$ according to the testing method of ASTM D-648. The unit of HDT is ° C.

e) Paint adhesion test: Paint adhesion was tested striping off at 90° angle a pressure sensitive tape firmly attached on the surface of a specimen after cross-cutting it at 1 mm intervals according to the testing methods of ISO2409 and JIS K5600-5-6. The judgment was done by the below table.

| Classification | Appearance | Surface State |
| --- | --- | --- |
| 0 | (1) Not detected any damage on the surface | |
| 1 | (1) Slight peel-off is detected at cross points of cutting<br>(2) Peel-off affected with cutting is less than 5%<br>(3) Less than 50% peel-off in a lattice | |
| 2 | (1) Peel-off is detected along straight line<br>(2) Peel-off affected with cutting is about 5~15%<br>(3) Less than 50% peel-off in a lattice | |
| 3 | (1) Peel-off is considerably detected along straight line<br>(2) Peel-off affected with cutting is about 15~35% | |
| 4 | (1) Peel-off is considerably detected along straight line<br>(2) Peel-off affected with cutting is about 35~65% | |
| 5 | (1) Complete peel-off of lattice | | f) Water immersion test: The coated specimen was immersed in tap water at 40±2° C. for 240 hours. After the specimen was taken out of the water, it was treated by air blow to remove the surface moisture. The surface state was examined after leaving it for 1 hour at room temperature and then the adhesion test was done according to the testing method as described in e) above.

g) Humidity test: The coated specimen was left in an oven at the temperature of 50±2° C. and the relative humidity of 98±2% of relative humidity for 240 hours. After the specimen was taken out of the oven, it was treated by air blow to remove the surface moisture. The surface state was examined after leaving for 1 hour at room temperature and then the adhesion test was done according to the testing method as described in e) above.

TABLE 1

| Component (weight %) | Comparative Example 1 | Comparative Example 2 | Comparative Example 3 | Example 1 | Example 2 | Example 3 |
|---|---|---|---|---|---|---|
| A-1 | 95 | | 95 | 95 | 95 | |
| A-2 | | 95 | | | | 95 |
| B-1 | 5 | 5 | | 2 | | |
| B-2 | | | | | 2 | 2 |
| C | | | 5 | 3 | 3 | 3 |
| D-1 | | | | | | |
| D-2 | | | | | | |
| D-3 | | | | | | |
| D-4 | | | | | | |
| E-1 | | | | | | |
| E-2 | | | | | | |
| F | | | | | | |
| Tensile strength | 950 | 830 | 970 | 980 | 970 | 850 |
| Flexural strength | 1300 | 1100 | 1500 | 1330 | 1310 | 1150 |
| Izod Impact strength | 6.1 | 5.7 | 4.5 | 6.2 | 6.1 | 5.9 |
| HDT | 83 | 68 | 87 | 85 | 85 | 70 |
| Adhesion test | 2 | 2 | 3 | 0 | 0 | 0 |
| Water immersion test | 4 | 4 | 3 | 1 | 1 | 0 |
| Humidity test | 4 | 4 | 3 | 1 | 1 | 1 |

Table 1 shows that compositions obtained by adding only polyalcohol to polyamide-6 or polyamide-66, i.e., when polyamide resin was modified with only polyalcohol (Comparative Examples 1 and 2), showed relatively stable initial paint adhesion, but showed insufficient adhesion in the water immersion and humidity tests. Polyamide modified with only epoxy resin (Comparative Example 3) showed unstable initial adhesion, as well as insufficient adhesion in the water immersion and humidity tests. Polyamide modified with only epoxy resin showed that the impact strength was drastically decreased, while the tensile strength and the flexural strength were slightly increased. In contrast thereto, compositions obtained by adding both polyalcohol and epoxy resin to polyamide-66 (Examples 1 and 2) showed good initial adhesion as well as in the water immersion and humidity tests. Polyamide-66 modified with the both polyalcohol and epoxy resin showed similar or improved results in physical properties compared to the comparative compositions. Furthermore, compositions obtained by using polyamide-6 instead of polyamide-66 (Example 3) showed similar results as when polyamide-66 was used as the polyamide resin; and as such, it was determined that when polyalcohol and epoxy resin are simultaneous used, the paint adhesion property as well as the tensile strength and the flexural strength are significantly improved, regardless of the type of polyamide resin employed.

TABLE 2

| Component (weight %) | Comparative Example 4 | Comparative Example 5 | Example 4 | Example 5 |
|---|---|---|---|---|
| A-1 | 65 | 40 | 65 | 95 |
| A-2 | | 23 | | |
| B-1 | 5 | 5 | 2 | |
| B-2 | | | | 2 |
| C | | | 3 | 3 |
| D-1 | 15 | 10 | 10 | 10 |
| D-2 | 5 | 5 | 5 | 5 |
| D-3 | 10 | 10 | 10 | 10 |
| D-4 | | 5 | 5 | 5 |
| E-1 | | | | |
| E-2 | | | | |
| F | | | | |

TABLE 2-continued

| Component (weight %) | Comparative Example 4 | Comparative Example 5 | Example 4 | Example 5 |
|---|---|---|---|---|
| Tensile strength | 585 | 575 | 592 | 590 |
| Flexural strength | 880 | 870 | 890 | 889 |
| Izod Impact strength | 94.5 | 94.1 | 95.3 | 96.5 |
| HDT | 160 | 162 | 163 | 164 |
| Adhesion test | 2 | 2 | 0 | 0 |
| Water immersion test | 3 | 3 | 1 | 0 |
| Humidity test | 3 | 3 | 1 | 1 |

Table 2 shows the result of polyamide-6 or polyamide-66 modified with thermoplastic impact modifier used to improve impact strength. As shown in the previous examples, in case of employing only polyalcohol to modify the polyamide resin (Comparative Examples 4 and 5), it was shown that, while initial paint adhesion was relatively stable, the water immersion and humidity tests showed insufficient adhesion. On the other hand, in case of employing both polyalcohol and epoxy resin to modify the polyamide resin (Examples 4 and 5), the initial paint adhesion was excellent, and the water immersion and humidity tests showed excellent adhesion. Furthermore, the polyamide resin modified with both polyalcohol and epoxy resin showed similar or improved results in physical properties compared to the comparative compositions.

TABLE 3

| Component (weight %) | Comparative Example 6 | Example 6 | Comparative Example 7 | Example 7 |
|---|---|---|---|---|
| A-1 | 65 | 65 | 65 | 65 |
| A-2 | | | | |
| B-1 | | | | |
| B-2 | | 2 | | 2 |
| C | 5 | 3 | 5 | 3 |
| D-1 | | | | |
| D-2 | | | | |
| D-3 | | | | |
| D-4 | | | | |
| E-1 | 30 | 30 | | |
| E-2 | | | 30 | 30 |
| F | | | | |
| Tensile strength | 1850 | 1910 | 900 | 920 |
| Flexural strength | 2700 | 2800 | 1500 | 1520 |
| Izod Impact strength | 4.9 | 10.8 | 5.2 | 5.3 |
| HDT | 245 | 250 | 175 | 178 |
| Adhesion test | 3 | 0 | 2 | 0 |
| Water immersion test | 4 | 1 | 3 | 0 |
| Humidity test | 4 | 1 | 4 | 1 |

Table 3 shows the result of polyamide-6 or polyamide-66 reinforced with glass fiber or mineral filler used as reinforcement agent. As shown in the previous examples, the polyamide resin modified with both polyalcohol and epoxy resin (Examples 6 and 7) showed better paint adhesion properties compared to the polyamide resin modified with only polyalcohol (Comparative Examples 6 and 7).

TABLE 4

| Component (weight %) | Comparative Example 8 | Comparative Example 9 | Comparative Example 10 | Comparative Example 11 |
|---|---|---|---|---|
| A-1 | 100 | 65 | 70 | 70 |
| A-2 | | | | |
| B-1 | | | | |
| B-2 | | | | |
| C | | | | |
| D-1 | | 15 | | |
| D-2 | | 5 | | |
| D-3 | | 10 | | |
| D-4 | | 5 | | |
| E-1 | | | 30 | |
| E-2 | | | | 30 |
| F | | | | |
| Tensile strength | 900 | 580 | 1890 | 870 |
| Flexural strength | 1300 | 870 | 2800 | 1400 |
| Izod Impact strength | 6.0 | 92.5 | 10.3 | 5.2 |
| HDT | 82 | 160 | 245 | 176 |
| Adhesion test | 5 | 3 | 5 | 3 |
| Water immersion test | 5 | 4 | 5 | 4 |
| Humidity test | 5 | 4 | 5 | 5 |

Table 4 shows that when the additives, which are responsible for paint adhesion property (polyalcohol and epoxy resin), were not added to the polyamide resin (Comparative Example 8), there was complete peel-off in all tests relating to the paint adhesion property. Moreover, in case of adding thermoplastic impact modifier to the polyamide resin (Comparative Example 9), there was some paint adhesion Initially even without the above mentioned additives responsible for paint adhesion property, but there was severe peel-off in the water immersion and humidity tests. Likewise, in case of adding glass fibre to the polyamide resin without using the additives responsible for paint adhesion property (Comparative Example 10), the result was similar to the above Comparative Example 8 in that there was complete peel-off; and in case of using talc (Comparative Example 11), the result was similar to Comparative Example 9. As such, it was confirmed that thermoplastic impact modifier and mineral filler are advantageous for paint adhesion.

TABLE 5

| Component (weight %) | Comparative Example 12 | Comparative Example 13 | Comparative Example 14 | Example 8 | Example 9 | Example 10 |
|---|---|---|---|---|---|---|
| A-1 | 85 | | 80 | 80 | 80 | |
| A-2 | | 85 | | | | 80 |
| B-1 | | | | 2 | | |
| B-2 | | | 5 | | 2 | 2 |
| C | | | | 3 | 3 | 3 |
| D-1 | | | | | | |
| D-2 | | | | | | |
| D-3 | | | | | | |
| D-4 | | | | | | |
| E-1 | | | | | | |
| E-2 | | | | | | |
| F | 15 | 15 | 15 | 15 | 15 | 15 |
| Tensile strength | 970 | 880 | 950 | 990 | 980 | 890 |
| Flexural strength | 1500 | 1100 | 1450 | 1530 | 1510 | 1150 |
| Izod Impact strength | 5.1 | 4.9 | 5.2 | 5.3 | 5.2 | 5.0 |
| HDT | 95 | 75 | 93 | 98 | 98 | 76 |
| Adhesion test | 3 | 2 | 1 | 1 | 1 | 0 |
| Water immersion t. | 3 | 3 | 3 | 1 | 1 | 1 |
| Humidity test | 3 | 3 | 3 | 1 | 2 | 1 |

Similarly, Table 5 shows that when PPO, which is responsible for dimensional stability, was added to polyamide-6 or polyamide-66, there was improvement in the paint adhesion property when both polyalcohol and epoxy resin were used to modify the polyamide resin (Examples 8-10), compared to when the additives responsible for the paint adhesion property (polyalcohol or epoxy resin) were not added to the polyamide resin (Comparative Examples 12 and 13), or compared to when the polyamide resin was modified with only polyalcohol (Comparative Example 14).

As described above, the polyamide resin composition according to the present invention, which includes polyalcohol and epoxy resin, exhibits excellent paint adhesion property, and can advantageously be applied to the interior and exterior parts of an automobile requiring paining, such that it is not necessary to use a primer during painting process to achieve the similar paint adhesion property obtained from using a primer, which is related to paint adhesion property during painting process, while maintaining, or more or less improving, the superior mechanical and thermal properties of polyamide.

The invention claimed is:

1. A shaped article comprising a thermoplastic polyamide resin composition having improved paint adhesion properties, the thermoplastic polyamide resin composition comprising: a) from 40 to 98 weight % of at least one crystalline polyamide resin; b) from 0.1 to 30 weight % of at least one polyalcohol; and c) from 0.1 to 30 weight % of at least one epoxy resin, where the weight % is based on the total weight of the composition, the shaped article having a paint coating applied thereover.

2. The shaped article as defined by claim 1, wherein the relative viscosity of said at least one crystalline polyamide resin ranges from 2.0 to 3.7; and the number average molecular weight of said at least one crystalline polyamide resin ranges from 5,000 to 70,000.

3. The shaped article as defined by claim 1, wherein said at least one crystalline polyamide resin is an aliphatic polyamide, an aromatic polyamide, or a copolymer thereof.

4. The shaped article as defined by claim 1, wherein said at least one crystalline polyamide resin is selected from the group consisting of polyamide-6, polyamide-66, and copolymers thereof.

5. The shaped article as defined by claim 1, wherein the viscosity of said at least one polyalcohol ranges from 40 to 500 cps; and the number average molecular weight of said at least one polyalcohol ranges from 150 to 2,000.

6. The shaped article as defined by claim 5, wherein said at least one polyalcohol is selected from the group consisting of a glycerol oligomer, polyglycerol, polyvinyl alcohol, and ethylenevinyl alcohol copolymer (EVOH).

7. The shaped article as defined by claim 1, wherein the number average molecular weight of said at least one epoxy resin ranges from 5,000 to 200,000; and the epoxy equivalent weight of said at least one epoxy resin ranges from 100 to 6000 g/eq.

8. The shaped article as defined by claim 7, wherein said at least one epoxy resin is selected from the group consisting of DGEBA (diglycidyl ether of bisphenol A) epoxy resin, DGEBF (diglycidyl ether of bisphenol F) epoxy resin, hydrogenated BPA (hydrogenated bisphenol A) epoxy resin, brominated epoxy resin, cycloaliphatic epoxy resin, rubber modified epoxy resin, aliphatic polyglycidyl epoxy resin, and glycidyl amine epoxy resin.

9. The shaped article as defined by claim 1, further comprising one or more additives selected from the group consisting of d) a thermoplastic impact modifier; e) a reinforcement agent; and f) a polyoxide.

10. The shaped article as defined by claim 9, wherein the at least one polyoxide is selected from the group consisting of polymethylene oxide (POM), polyethylene oxide (PEO), and polyphenylene oxide (PPO).

11. The painted shaped article as defined by claim 1, devoid of any primer between said paint and said thermoplastic polyamide resin composition.

12. The shaped article as defined by claim 1, wherein the shaped article is a painted interior or exterior automotive part.

13. The shaped article as defined by claim 1, wherein said at least one crystalline polyamide resin is an aliphatic polyamide selected from the group consisting of polyamide-6, polyamide-66, polyamide-610, polyamide-11 and polyamide-12, and a copolymer thereof.

14. The shaped article as defined by claim 1, wherein said at least one crystalline polyamide resin is an aromatic polyamide selected from the group consisting of a terephthalic polyamide and an isophthalic polyamide, and a copolymer thereof.

15. A method of making a shaped article having a paint coating applied on the surface of the article, the method comprising:
   a) forming a thermoplastic polyamide resin composition comprising: i) from 40 to 98 weight % of at least one crystalline polyamide resin; ii) from 0.1 to 30 weight % of at least one polyalcohol; and iii) from 0.1 to 30 weight % of at least one epoxy resin, where the weight % is based on the total weight of the composition;
   b) forming the article from the thermoplastic composition; and
   c) applying the paint coating onto the surface of the article.

* * * * *